(12) United States Patent
Fink et al.

(10) Patent No.: US 6,946,051 B2
(45) Date of Patent: Sep. 20, 2005

(54) ADHESIVE WITH GLYCIDYL (METH) ACRYLATE

(75) Inventors: Ralf Fink, Schifferstadt (DE); Alexander Centner, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 13 days.

(21) Appl. No.: 10/286,787

(22) Filed: Nov. 4, 2002

(65) Prior Publication Data

US 2003/0111175 A1 Jun. 19, 2003

(30) Foreign Application Priority Data

Nov. 29, 2001 (DE) .......................................... 101 58 420

(51) Int. Cl.$^7$ ............................................. C09J 113/00
(52) U.S. Cl. ...................... 156/327; 156/330; 156/334; 526/332
(58) Field of Search ........................ 526/332; 156/327, 156/330, 334

(56) References Cited

U.S. PATENT DOCUMENTS 4,980,410 A * 12/1990 Fryd et al. .................. 524/510
5,128,386 A 7/1992 Rehmer et al.

FOREIGN PATENT DOCUMENTS

| DE | 38 44 444 | 8/1990 |
| EP | 0 346 734 | 12/1989 |
| EP | 0 896 984 A1 | 2/1999 |
| EP | 0 992 559 | 4/2000 |
| EP | 1 213 306 | 6/2002 |
| WO | WO 96/00250 | 1/1996 |
| WO | WO 02/20647 | 3/2002 |

OTHER PUBLICATIONS

Patent Abstracts of Japan, JP 60–080857, May 8, 1985.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

A method of joining shaped parts by adhesive bonding comprises
A) first coating at least one of the shaped part surfaces that are to be joined by adhesive with a polymer composed of at least 5% by weight of glycidyl (meth)acrylate and
B) then adhesively bonding the shaped parts, with crosslinking of the glycidyl groups.

30 Claims, No Drawings

ADHESIVE WITH GLYCIDYL (METH) ACRYLATE

The invention relates to
a method of joining shaped parts by adhesive bonding, which comprises
A) first coating at least one of the shaped part surfaces that are to be joined by adhesive with a polymer composed of at least 5% by weight of glycidyl (meth)acrylate and
B) then adhesively bonding the shaped parts, with crosslinking of the glycidyl groups.

The invention further relates to polymers suitable for this method.

Structural bonds are nowadays produced using primarily one-pack and two-pack epoxy adhesives which lead to adhesive bonds having high tensile shear strengths. The materials employed are often aromatic epoxides (Epikote products, for example). After the epoxy component has been mixed with the hardener, normally comprising amines of relatively high functionality, the initially liquid starting substances solidify to a glassy mass. The adherends must be fixed until a certain level of strength has been reached, after which the fixture can be removed and the bond subjected to load. As well as the cure time which elapses until the bond acquires load-bearing capacity, the lack of elasticity in the bond is often a problem, with the consequence that, for example, vibrations or else differences in thermal expansion coefficients can lead to brittle cracking.

EP-A-896 984 and WO 96/00250 disclose pressure sensitive adhesives containing glycidyl (meth)acrylate as a comonomer or polyglycidyl (meth)acrylate as a cocomponent. The glycidyl (meth)acrylate content according to WO 96/00250 is typically 1–2% by weight.

These pressure sensitive adhesives do not attain the high strengths achieved when using epoxy adhesives as structural adhesives, i.e., adhesives used for the permanent bonding of shaped parts.

It is an object of the present invention to provide a method by means of which shaped parts may be bonded with high strength, the strength of the bond as far as possible matching that obtained when using epoxy adhesives. The bond ought also to have a certain degree of elasticity. Moreover, initial adhesion should be such that it is no longer necessary to fix the shaped parts.

We have found that this object is achieved by the method defined at the outset and by polymers suitable for this method.

The method of the invention uses a polymer composed of at least 5% by weight of glycidyl acrylate and/or glycidyl methacrylate (glycidyl (meth)acrylate collectively).

The polymer is composed preferably of at least 10% by weight, with particular preference at least 15% by weight, of glycidyl (meth)acrylate.

The polymer is composed preferably of not more than 50% by weight, in particular not more than 40% by weight, of glycidyl (meth)acrylate.

The polymer in question is preferably a polymer obtainable by free-radical polymerization of ethylenically unsaturated compounds.

Other monomers of which the polymer may be composed besides glycidyl (meth)acrylate include, for example, $C_1$–$C_{16}$ alkyl (meth)acrylates, vinyl esters of carboxylic acids containing up to 20 carbon atoms, vinylaromatics having up to 20 carbon atoms, ethylenically unsaturated nitrites, vinyl halides, vinyl ethers of alcohols containing 1 to 10 carbon atoms, aliphatic hydrocarbon atoms having 2 to 8 carbon atoms and 1 or 2 double bonds, or mixtures of these monomers.

Mention may be made in particular of $C_1$–$C_8$ alkyl (meth)acrylates, e.g., methyl (meth)acrylate, ethyl (meth)acrylate, n-butyl (meth)acrylate, 2-ethylhexyl (meth)acrylate.

Examples of suitable vinylaromatic compounds include vinyl toluene, α- and p-methylstyrene, α-butylstyrene, 4-n-butylstyrene, 4-n-decylstyrene, and, preferably, styrene. Examples of nitrites are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers include vinyl methyl ether, vinyl ethyl ether, and vinyl isobutyl ether. Vinyl ethers of alcohols containing 1 to 4 carbon atoms are preferred.

As hydrocarbons having 2 to 8 carbon atoms and two olefinic double bonds mention may be made of butadiene, isoprene, and chloroprene.

Further suitable monomers include in particular monomers containing carboxylic, sulfonic or phosphonic acid groups. Carboxylic acid groups are preferred. Examples that may be mentioned include acrylic acid, methacrylic acid, itaconic acid, maleic acid, and fumaric acid.

Examples of further monomers include hydroxyl-containing monomers, particularly $C_1$–$C_{10}$ hydroxyalkyl (meth)acrylates, and also (meth)acrylamide.

The polymer is preferably composed in total of at least 50% by weight, with particular preference at least 70% by weight, and very particularly at least 85% by weight of monomers containing a (meth)acrylic group.

Besides glycidyl (meth)acrylate, the compounds in question are preferably $C_1$–$C_{16}$ alkyl (meth)acrylates, especially $C_1$–$C_8$ alkyl (meth)acrylates.

Monomers containing acid groups, especially with carboxylic acids, e.g., (meth)acrylic acid, are preferably present at most in small amounts, preferably below 1% by weight, in the polymer. With particular preference the polymer contains no acid group monomers.

The glass transition temperature (Tg) of the polymer is preferably from −60 to +50° C., with particular preference from −55 to +45° C., with very particular preference from −55 to +40° C., and in particular from −55 to +20° C.

The glass transition temperature of the polymer can be determined by customary methods such as differential thermoanalysis or differential scanning calorimetry (cf., e.g., ASTM 3418/82, midpoint temperature).

The polymers may be prepared by copolymerizing the monomeric components using the customary polymerization initiators and also, where appropriate, regulators, polymerization taking place at the customary temperatures in bulk (without solvent), in emulsion, e.g., in water or liquid hydrocarbons, or in solution.

The polymers may be prepared by polymerizing the monomers in solvents (solution polymerization, solution polymers), particularly in solvents with a boiling range from 50 to 150° C., preferably from 60 to 120° C., using the customary amounts of polymerization initiators, which are generally from 0.01 to 10% by weight, in particular from 0.1 to 4% by weight, based on the overall weight of the monomers. Suitable solvents include particularly alcohols, such as methanol, ethanol, n- and iso-propanol, n- and iso-butanol, preferably isopropanol and/or isobutanol, and also hydrocarbons such as toluene and, in particular, petroleum spirits with a boiling range from 60 to 120° C. It is further possible to use ketones, such as acetone, methyl ethyl ketone, and methyl isobutyl ketone, and esters, such as ethyl acetate, and also mixtures of such solvents, preference being given to mixtures containing isopropanol and/or isobutanol in amounts of from 5 to 95% by weight, in particular from 10 to 80% by weight, preferably from 25 to 60% by weight, based on the solvent mixture employed.

Examples of suitable polymerization initiators for the solution polymerization include azo compounds, ketone peroxides and alkyl peroxides.

Following polymerization in solution the solvents may where appropriate be separated off under reduced pressure, operating at elevated temperatures in the range, for example, from 100 to 150° C. The polymers may then be used in the solvent-free state, i.e., as melts. In some cases it is also of advantage to prepare the novel UV-crosslinkable polymers by polymerization in bulk, e.g., without using a solvent, in which case it is possible to operate batchwise or else continuously, in accordance, for example, with the indications in U.S. Pat. No. 4,042,768.

The polymer may also be prepared by emulsion polymerization, and in that case is an emulsion polymer.

In the case of emulsion polymerization, ionic and/or nonionic emulsifiers and/or protective colloids or stabilizers are used as surface-active compounds.

A detailed description of suitable protective colloids is given in Houben-Weyl, Methoden der organischen Chemie, Volume XIV/1, Makromolekulare Stoffe, Georg-Thieme-Verlag, Stuttgart, 1961, pp. 411 to 420. Suitable emulsifiers include anionic, cationic and nonionic emulsifiers. As accompanying surface-active substances it is preferred to use exclusively emulsifiers, whose molecular weights, unlike those of the protective colloids, are normally below 2000 g/mol. Where mixtures of surface-active substances are used, the individual components must of course be compatible with one another; in case of doubt, this can be checked by means of a few preliminary tests. It is preferred to use anionic and nonionic emulsifiers as surface-active substances. Examples of customary emulsifiers are ethoxylated fatty alcohols (EO units: 3 to 50, alkyl: $C_8$ to $C_{36}$), ethoxylated mono-, di- and tri-alkylphenols (EO units: 3 to 50, alkyl: $C_4$ to $C_9$), alkali metal salts of dialkyl esters of sulfosuccinic acid and also alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated alkyl phenols (EO units: 3 to 50, alkyl: $C_4$ to $C_9$), of alkyl sulfonic acids (alkyl: $C_{12}$ to $C_{18}$) and of alkylaryl sulfonic acids (alkyl: $C_9$ to $C_{18}$).

Suitable emulsifiers can also be found in Houben-Weyl, Methoden der organischen Chemie, Volume 14/1, Makromolekulare Stoffe, Georg Thieme Verlag, Stuttgart, 1961, pages 192 to 208.

Examples of emulsifier trade names are Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, and Emulphor NPS 25.

The surface-active substance is normally used in amounts of from 0.1 to 10% by weight, based on the monomers to be polymerized.

Water-soluble initiators for the emulsion polymerization are, for example, ammonium salts and alkali metal salts of peroxodisulfuric acid, such as sodium peroxodisulfate, hydrogen peroxide or organic peroxides, such as tert-butyl hydroperoxide.

The systems known as redox (reduction-oxidation) initiator systems are particularly suitable.

The redox initiator systems are composed of at least one usually inorganic reducing agent and one organic or inorganic oxidizing agent.

The oxidizing component comprises, for example, the initiators already mentioned above for the emulsion polymerization.

The reducing components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used together with soluble metal compounds whose metallic component is able to exist in a plurality of valence states.

Examples of customary redox initiator systems are ascorbic acid/iron(II) sulfate/sodium peroxodisulfate, tert-butyl hydroperoxide/sodium disulfite, tert-butyl hydroperoxide/Na hydroxymethanesulfinate. The individual components e.g., the reducing component, may also be mixtures, an example being a mixture of the sodium salt of hydroxymethanesulfinic acid with sodium disulfite.

The abovementioned compounds are used mostly in the form of aqueous solutions, the lower concentration being determined by the amount of water that is acceptable in the dispersion and the upper concentration by the solubility of the respective compound in water. In general the concentration is from 0.1 to 30% by weight, preferably from 0.5 to 20% by weight, with particular preference from 1.0 to 10% by weight, based on the solution.

The amount of initiators is generally from 0.1 to 10% by weight, preferably from 0.5 to 5% by weight, based on the monomers to be polymerized. It is also possible for two or more different initiators to be used in the emulsion polymerization.

In the context of the polymerization it is possible to use regulators in amounts, for example, of from 0 to 0.8 part by weight per 100 parts by weight of the monomers to be polymerized, the effect of these regulators being to reduce the molar mass. Examples of suitable regulators include compounds containing a thiol group such as tert-butyl mercaptan, ethyl hexyl thioglycolate, mercaptoethanol, mercaptopropyltrimethoxysilane or tert-dodecyl mercaptan. The proportion of these regulators when the adhesive is used for composite film lamination may be in particular from 0.05 to 0.8 part by weight, preferably from 0.1 to 0.5 part by weight, per 100 parts by weight of the monomers to be polymerized. In the case where the adhesive is used for high gloss film lamination, the use of a regulator is less preferred. The regulators contain no polymerizable ethylenically unsaturated group. The regulators terminate the polymerization chain and are therefore attached terminally to the polymer chains.

The emulsion polymerization takes place in general at from 30 to 130° C., preferably from 50 to 90° C. The polymerization medium may consist either of water alone or of mixtures of water and water-miscible liquids such as methanol. It is preferred to use just water. The emulsion polymerization may be conducted either as a batch process or in the form of a feed process, including staged or gradient procedures. Preference is given to the feed technique, in which a portion of the polymerization mixture is introduced as an initial charge, heated to the polymerization temperature, and partly polymerized and then the remainder of the polymerization mixture is supplied to the polymerization zone, normally by way of two or more spatially separate feed streams of which one or more contain the monomers in straight form or in emulsified form, this or these feed additions taking place continuously, in stages, or under a concentration gradient, with the polymerization being maintained. For the polymerization it is also possible to include a polymer seed in the initial charge for the purpose, for example, of more effective setting of particle size.

The manner in which the initiator is added to the polymerization vessel in the course of the free-radical aqueous emulsion polymerization is known to the skilled worker. It may either be included in its entirety in the initial charge to the polymerization vessel or else inserted continuously or in stages at the rate at which it is consumed in the course of the free-radical aqueous emulsion polymerization. In each individual case this will depend both on the chemical nature of the initiator system and on the polymerization temperature. It is preferred to include one portion in the initial charge and to supply the remainder to the polymerization zone at the rate at which it is consumed.

To remove the residual monomers, it is common after the end of the emulsion polymerization proper, i.e., after a monomer conversion of at least 95%, to add further initiator.

With the feed technique, the individual components may be added to the reactor from the top, in the side, or from below, through the reactor floor.

The emulsion polymerization gives aqueous polymer dispersions with solids contents of generally from 15 to 75% by weight and preferably from 40 to 75% by weight.

For the purposes of the present invention it is sufficient to use copolymers as obtainable by polymerization by the above techniques, as they are. In other words, there is no need for a particular form of the arrangement of the polymer chains: for example, pendant polymer chains as obtained by graft polymerization. Graft polymers, such as are described, for example, in WO 96/00250, inter alia, are therefore not preferred.

The polymer preferably has a gel content of from 0 to 80% by weight (based on the polymer), with particular preference from 5 to 60% by weight, and with very particular preference from 10 to 60% by weight, in particular from 30 to 60% by weight. Alternatively, the above gel content may be brought about after the shaped parts have been coated, by precrosslinking the polymer film on the shaped part surface.

The gel content means the amount of insolubles present.

The gel content is determined and defined by the following method: the dispersion is dried at 21° C. to give a film with a thickness of approximately 1 mm. One gram of the polymer film is placed in 100 ml of tetrahydrofuran and left to stand at 21° C. for one week. The resulting solution or mixture is then filtered using a cloth filter (mesh size 125 μm). The residue (swollen film) is dried in a vacuum oven at 21° C. for 2 days and then weighed. The gel content is the mass of the weighed residue divided by the mass of the polymer film used.

The gel content may be brought about during the polymerization, e.g., the emulsion or solution polymerization. Means suitable for this purpose are known to the skilled worker. In particular it is possible to use crosslinking monomers containing at least two polymerizable groups, e.g., butanediol diacrylates or divinylbenzene.

The desired gel content may also be brought about during or after coating on the shaped part surface, by using, for example, crosslinkers, which are added to the dispersion or solution of the polymer and bring about crosslinking before or during drying. Mention may be made, for example, of the addition of dihydrazides, which react with keto or aldehyde groups in the polymer during the drying process.

Also suitable, in particular, is the photochemical crosslinking of the polymer.

For this purpose, the polymer is preferably UV crosslinkable. For UV crosslinking a photoinitiator may be added. Alternatively, the photoinitiator may be attached to the polymer.

By irradiation with high energy light, especially UV light, the photoinitiator brings about crosslinking of the polyacrylate, preferably by means of a chemical grafting reaction of the photoinitiator with a spatially adjacent polymer chain. Crosslinking may take place in particular by insertion of a carbonyl group of the photoinitiator into an adjacent C—H bond to form a —C—C—O—H group.

The polymer may be admixed with preferably from 0.0001 to 1 mol, with particular preference from 0.0002 to 0.1 mol, with very particular preference from 0.0003 to 0.01 mol, of the photoinitiator, or the polymer contains said amounts in the form of a photoinitiator-active group which is attached to the polymer. These figures are based on 100 g of polymer.

The photoinitiator comprises, for example, acetophenone, benzophenone, benzoin ethers, benzil dialkyl ketals or derivatives thereof.

The photoinitiator is preferably attached to the polymer.

With particular preference the photoinitiator is one which has been incorporated into the polymer chain by free-radical copolymerization. To this end the photoinitiator preferably contains an acrylic or methacrylic group.

Suitable copolymerizable photoinitiators are acetophenone or benzophenone derivatives which contain at least one, preferably one, ethylenically unsaturated group. The ethylenically unsaturated group is preferably an acrylic or methacrylic group.

The ethylenically unsaturated group may be attached directly to the phenyl ring of the acetophenone or benzophenone derivative. In general there is a spacer group located between phenyl ring and ethylenically unsaturated group.

The spacer group may contain, for example, up to 100 carbon atoms.

Suitable acetophenone or benzophenone derivatives are described, for example, in EP-A-346 734, EP-A-377 199 (claim 1), DE-A-4 037 079 (claim 1) and DE-A-3 844 444 (claim 1), and by means of this reference are included, in terms of their disclosure content, in the present specification. Preferred acetophenone and benzophenone derivatives are those of the formula

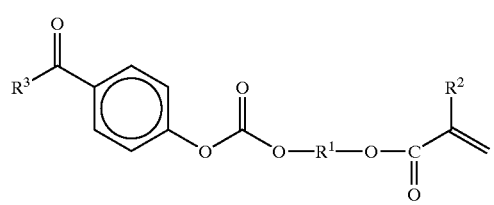

I where $R^1$ is an organic radical having up to 30 carbon atoms, $R^2$ is a hydrogen atom or a methyl group, and $R^3$ is an unsubstituted or substituted phenyl group or a $C_1$–$C_4$ alkyl group.

With particular preference $R^1$ is an alkylene group, particularly a $C_2$–$C_8$ alkylene group.

The method of the invention can be used for joining any desired shaped parts. The method is preferably utilized for what are known as structural bonds, i.e., for the long-term joining of shaped parts for the purpose of producing a new shaped part with a new external shape.

The shaped parts to be bonded may be composed of any of a very wide variety of materials; mention may be made of wood, plastics, cardboard, paper, rubber, and metal, e.g., aluminum.

The polymer is applied to at least one and preferably both of the shaped part surfaces that are to be joined.

The amount of polymer applied may be varied widely and depends on the intended use. For example, amounts of from 1 to 500 g (solids, i.e., without solvents) may be considered.

Where the polymer is applied in the form of an aqueous dispersion or as a solution, it is generally dried in order to remove water or solvents.

In the case of photochemical crosslinking (see above), coating is followed by exposure to high-energy light, especially UV light.

The degree of crosslinking of the polymers depends on the duration and intensity of radiation exposure.

The radiative energy in the wavelength range from 250 to 260 nm is preferably from 3 to 70 mJ/cm$^2$ irradiated surface (measured using the UV Power Puck®).

The shaped part surfaces may also be coated by a transfer process.

For example, the polymer may be applied to a removable backing, especially siliconized films or siliconized paper, and stored in this form or commercialized in this form.

For subsequent use, the polymer is applied by sticking the polymer-coated support onto the shaped part surface and peeling off the support on the surface.

Adhesive bonding of the shaped parts takes place, finally, by crosslinking of the glycidyl groups.

The polymer preferably has the gel content described above prior to the crosslinking of the glycidyl (meth)acrylate groups.

Prior to crosslinking of the glycidyl (meth)acrylate groups the polymer is tacky; in particular, it has properties of a pressure sensitive adhesive. The polymer has in particular a quickstick value (in accordance with the measurement method below) of more than 3, with particular preference more than 5 N/25 mm.

Prior to crosslinking of the glycidyl (meth)acrylate groups the polymer also already has a certain degree of cohesion, i.e., internal strength.

The shear strength, as a measure of the cohesion, is preferably more than 1 hour (h) in accordance with the measurement method below, prior to the reaction of the glycidyl groups.

The polymer may have the above properties immediately following its preparation or after precrosslinking during or after precrosslinking has been carried out during or after coating.

The quickstick value is determined in accordance with the following procedure:

The dispersions or solutions of the polymer are knife-coated onto PE film sections with a width of 25 mm at a rate of 20 g/m$^2$ (solids), dried at 90° C. for 3 minutes, and precrosslinked where appropriate.

The resulting films were bonded to a steel plate and quickstick was tested at 23° C. and 50% relative atmospheric humidity.

To determine the quickstick value, both ends of a test strip measuring 17.5 cm long by 2.5 cm wide were clamped in the jaws of a tensile machine to form a loop which was then contacted with a chromed steel surface at a rate of 30 cm/min (lowering the loop onto the chromed steel plate). Following complete contact, and after a contact time of 1 minute, the loop is removed again and the maximum force measured during this procedure, in N/2.5 cm, is taken as a measure of the quickstick value (loop value, tack).

To determine the shear strength, the test strips with a bonded area of 25 mm$^2$ were stuck onto a chromed V2A steel test plate, rolled down once with a 1 kg roller, stored for 10 minutes (under standard conditions at 21° C. and 1 bar) and then loaded with a 0.5 kg suspended weight (under standard conditions at 21° C. and 1 bar). The shear strength was measured as the time taken for the weight to fall off; in each case the average of 5 measurements was calculated.

The peel strength is also useful as a measure of the adhesion, in addition to the quickstick value.

For determining the peel strength (adhesion), a 2.5 cm wide test strip was stuck onto a chromed V2A steel test plate and rolled down once with a 1 kg roller. One end of the strip was then placed in the upper jaw of a tensile testing apparatus. The adhesive strip was pulled from the test surface (V2A steel) at an angle of 180° and a speed of 300 mm/min; in other words, the test strip was bent over and pulled parallel to the test plate, and the force required to do this was measured. The measure of the peel strength was the force in N/2 cm, as the average of five measurements.

The peel strength was determined 24 hours after the adhesive bonding.

The adhesive bonding of the shaped part surfaces to one another takes place preferably in the same way as is normal for epoxy adhesives.

The glycidyl groups are able to crosslink with one another during adhesive bonding.

It is, however, also possible to add a hardener such as is normal for epoxy adhesives, so that the glycidyl groups react with this hardener and crosslink.

Suitable hardeners include compounds which possess reactive hydrogen atoms which in an addition reaction add onto epoxides to form a hydroxyl group.

Suitable compounds are therefore amines, carboxylic acids, carboxylic anhydrides, alcohols, and thio compounds.

The hardener preferably has on average at least one, more preferably at least two, reactive hydrogen atoms.

Hardeners of this kind may be highly reactive; if so, it is advisable not to add the hardener to the polymer until shortly before use.

Suitable hardeners are described, for example, in "Topics in Applied Chemistry, editions A. R. Katritzky, G. J. Sabongi, Plenum Press New York" and Kunststoff-Kompendium, Adolf Franck, Vogel Fachbuch.

Particular preference is given to chemical or photochemical crosslinking of the glycidyl groups, with no need to add hardeners.

For the photochemical crosslinking of the glycidyl groups it is preferred to add a photoinitiator for the cationic polymerization.

The adhesive bond is made by pressing the shaped parts together with a pressure, for example, of at least 1 kg/100 cm$^2$.

For crosslinking of the glycidyl groups the temperature is preferably from 10 to 180° C. (thermal crosslinking) or exposure is carried out using high energy light, especially UV light. In the case of thermal crosslinking high temperatures of from 100 to 180° C. may be suitable, especially for latent hardeners.

The adhesive bonds obtained are firm and durable. After the glycidyl groups have been crosslinked, there is little if any of the surface tack that is found with pressure sensitive adhesives.

The achieved or achievable strengths correspond to those of the customary epoxy adhesives. Strengths of that kind are virtually impossible to find by the above shear strength measurement method; values of more than 100 hours, in particular more than 500 hours, are produced.

It is a particular advantage of the invention that the polymer behaves initially like a pressure sensitive adhesive, with the consequence, for example, that it is no longer necessary to fix the shaped parts during bonding; instead, after the glycidyl groups have been crosslinked, the bond achieves strengths such as are customary with epoxy adhesives. The adhesive bonds also have a certain elasticity.

The method of the invention is especially suitable for structural bonds, i.e., for the construction of new shaped parts by firm and durable adhesive bonding of starting components and for seals. Mention may be made in particular of applications in automobile construction and also the sealing of plates, pipes, etc. The adherends may be composed of any of a very wide variety of materials, including in particular metal, glass, and plastic.

EXAMPLES

A polymer composed of

| | |
|---|---|
| 74.5% by weight of | n-butyl acrylate (nBA) |
| 25% by weight of | glycidyl methacrylate (GMA) |
| 0.5% by weight of | a copolymerizable photoinitiator of formula I (FI) | was knife-coated in a thickness of 60 $\mu$m onto a polyethylene film (at 110° C., so that the polymer was flowable) and precrosslinked with UV light (UV-C, 250–260 nm).

The precrosslinked polymer had the following strengths and quickstick values as a function of the UV-C dose:

| UV-C dose [mJ/cm$^2$] | Shear strength [min] | Peel strength [N/25 mm] | Quickstick [N/25 mm] |
|---|---|---|---|
| 7 | 18 | 19.5 | 14.7 |
| 15 | 183 | 15.7 | 14.3 |
| 30 | 214 | 13.3 | 14.6 |

The above polymer is therefore a polymer having customary pressure sensitive adhesive properties. It can therefore be used as a pressure sensitive adhesive.

When used for structural bonds, therefore, the shaped parts to be bonded can be fixed and joined using the adhesive.

After subsequent crosslinking of the glycidyl groups, strengths as for existing customary epoxy adhesives are achieved.

For crosslinking of the glycidyl groups, the above polymer was admixed with 1 part by weight of a hardener (dimethyl-dipropylene-diamine) per 10 parts by weight of polymer. The polymer was applied to sheet steel.

Thereafter, the coated steel sheets were bonded to one another or to steel foil (see table) and stored at 140° C. for 1 hour for crosslinking of the glycidyl groups.

Thereafter the adhesion values were determined in comparison with a commercial epoxy adhesive (UHU-Endfest).

The tensile shear strength (see table) relates to a dynamic method in which the bonded steel sheets are parted by a tensile force acting in the opposite direction, and the tensile force required for this purpose is measured.

Correspondingly, further polymers were prepared without photoinitiation and were mixed with different hardeners. The compositions and test results are set out in the table.

Hardening conditions: 1 hour at 140° C.

| Sample | Tensile shear strength, 100 mm/min steel panels (2 mm thick), bonded 2.0 cm × 4.0 cm [N/mm$^2$] |
|---|---|
| 75 nBA/25 GMA + phthalic acid (Polymer:hardener 10:1)* | 0.93 (steel) 0.75 (Alu) |
| 75 nBA/25 GMA + maleic acid (Polymer:hardener 10:1) | 2.0 (steel) 1.83 (Alu) |
| 75 nBA/25 GMA + N,N-dimethyl-tripropylenetriamine (Polymer:hardener 10:1) | 4.58 (steel) 4.85 (Alu) |
| 74.5 nBA/25 GMA/0.5 F1 + N,N-dimethyltripropylene-triamine (Polymer:hardener 10:1) | >11.5 (steel) |
| 90 nBA/10 GMA + N,N-dimethyltripolypropylene-triamine (Polymer:hardener 21:1) | 0.77 (steel) 0.66 (Alu) |
| 65 nBA/35 GMA + phthalic acid (Polymer:hardener 6:1) | 0.25 (steel) 0.1 (Alu) |
| 65 nBA/35 GMA + maleic acid (Polymer:hardener 8.5:1) | 3.47 (steel) |
| 65 nBA/35 GMA + N,N-dimethyltripropylene-triamine (Polymer:hardener 6:1) | 5.8 (steel) |
| 75 nBA/25 GMA + N-(3-aminopropyl)imidazole (Polymer:hardener 11:1) | 8.73 (steel) 7.7 (Alu) |
| UHU-Endfest | >11.5 (steel) |

*weight ratio

We claim:

1. A method of joining shaped parts by adhesive bonding, which comprises
   A) first coating at least one of the shaped part surfaces that are to be joined by adhesive with a polymer comprising at least 15% by weight of glycidyl (meth)acrylate and
   B) then adhesively bonding the shaped parts, with crosslinking of the glycidyl groups.

2. A method as claimed in claim 1, wherein the polymer comprises 15 to 50% by weight of glycidyl (meth)acrylate.

3. A method as claimed in claim 1, wherein the polymer is a free-radically polymerizable polymer obtainable by free-radical polymerization of ethylenically unsaturated compounds (monomers).

4. A method as claimed in claim 1, wherein the polymer comprises less than 1% by weight of monomers containing acid groups.

5. A method as claimed in claim 1, wherein the polymer is an emulsion polymer.

6. A method as claimed in claim 1, wherein the polymer is a solution polymer.

7. A method as claimed in claim 1, wherein the gel content of the polymer is from 0 to 80% by weight or this gel content is brought about during or after coating by precrosslinking the polymer film on the shaped part surface.

8. A method as claimed in claim 1, wherein the gel content is brought about during the actual preparation of the polymer by emulsion or solution polymerization.

9. A method as claimed in claim 1, wherein the gel content is brought about only by precrosslinking the polymer on the shaped part surface.

10. A method of joining shaped parts by adhesive bonding, which comprises
    A) first coating at least one of the shaped part surfaces that are to be joined by adhesive with a polymer comprising at least 5% by weight of glycidyl (meth)acrylate and B) then adhesively bonding the shaped parts, with crosslinking of the glycidyl groups, wherein the gel content is brought about only by precrosslinking the polymer on the shaped part surface and precrosslinking is effected by irradiation with high-energy light in the presence of from 0.0001 to 1 mol of photoinitiator groups per 100 g of polymer.

11. A method as claimed in claim 10, wherein the photoinitiator groups are attached to the polymer.

12. A method as claimed in claim 1, wherein the polymer prior to crosslinking of the glycidyl groups has a glass transition temperature of from −60 to +50° C.

13. A method as claimed in claim 1, wherein the polymer prior to crosslinking of the glycidyl groups has pressure sensitive adhesive properties.

14. A method as claimed in claim 1, wherein the glycidyl groups are crosslinked thermally or photochemically.

15. A method as claimed in claim 1, wherein after the crosslinking of the glycidyl groups the polymer is no longer tacky.

16. A method of joining shaped parts by adhesive bonding, which comprises

A) first coating at least one of the shaped part surfaces that are to be joined by adhesive with a polymer having a quick stick value of 3 N/25 mm or more and a shear strength of more than 1 hour which comprises at least 5% by weight of glycidyl (meth)acrylate and B) then adhesively bonding the shaped parts, with-crosslinking of the glycidyl groups.

17. A method as claimed in claim 16, wherein the polymer comprise 10 to 50% by weight of glycidyl (meth)acrylate.

18. A method as claimed in claim 16, wherein the polymer is a free-radically polymerizable polymer obtainable by free-radical polymerization of ethylenically unsaturated compounds (monomers).

19. A method as claimed in claim 16, wherein the polymer comprises less than 1% by weight of monomers containing acid groups.

20. A method as claimed in claim 16, wherein the polymer is an emulsion polymer.

21. A method as claimed in claim 16, wherein the polymer is a solution polymer.

22. A method as claimed in claim 16, wherein the gel content of the polymer is from 0 to 80% by weight or this gel content is brought about during or after coating by precrosslinking the polymer film on the shaped part surface.

23. A method as claimed in claim 16, wherein the gel content is brought about during the actual preparation of the polymer by emulsion or solution polymerization.

24. A method as claimed in claim 16, wherein the gel content is brought about only by precrosslinking the polymer on the shaped part surface.

25. A method as claimed in claim 24, wherein precrosslinking is effected by irradiation with high-energy light in the presence of from 0.0001 to 1 mol of photoinitiator groups per 100 g of polymer.

26. A method as claimed in claim 25, wherein the photoinitiator groups are attached to the polymer.

27. A method as claimed in claim 16, wherein the polymer prior to crosslinking of the glycidyl groups has a glass transition temperature of from −60 to +50° C.

28. A method as claimed in claim 16, wherein the polymer prior to crosslinking of the glycidyl groups has pressure sensitive adhesive properties.

29. A method as claimed in claim 16, wherein the glycidyl groups are crosslinked thermally or photochemically.

30. A method as claimed in claim 16, wherein after the crosslinking of the glycidyl groups the polymer is no longer tacky.

* * * * *